3,061,652
PREPARATION OF PERCHLORETHYLENE
Van C. Cayton, Pasadena, and Robert N. Montgomery and Joseph Perret, Baytown, Tex., assignors to Diamond Alkali Company, Cleveland, Ohio, a corporation of Delaware
Filed June 10, 1957, Ser. No. 664,617
4 Claims. (Cl. 260—654)

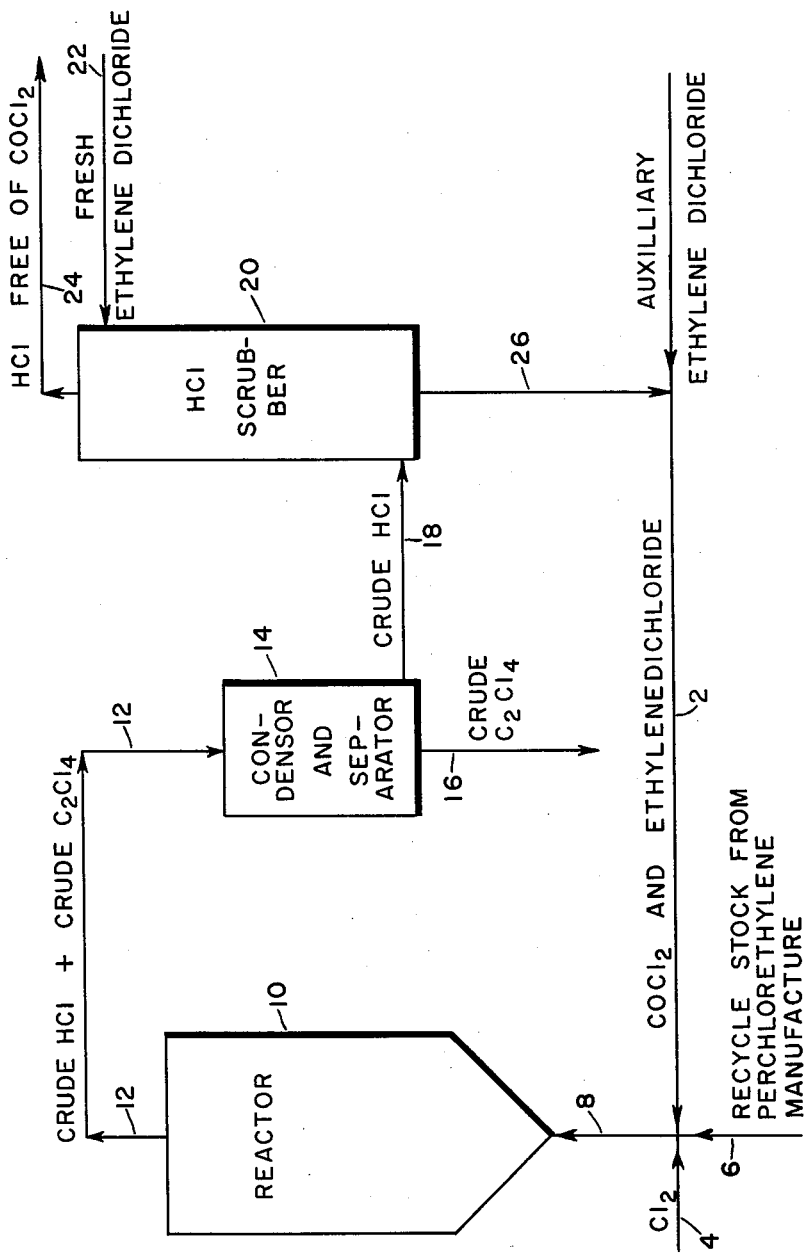

This invention relates to the purification of hydrogen chloride and more particularly to the purification of gaseous hydrogen chloride by the method of solvent scrubbing, and still more particularly relates to the purification of gaseous hydrogen chloride by solvent scrubbing with an organic solvent to remove impurities therefrom.

In the manufacture of unsaturated chlorohydrocarbons, for example perchlorethylene, by the reaction of chlorine and ethylene dichloride involving, simultaneously, chlorination and dehydrochlorination, the principal by-product obtained is hydrogen chloride. Similarly, the manufacture of trichlorethylene by the chlorination of acetylene to tetrachloroethane and dehydrochlorination, also produces large quantities of hydrogen chloride. Inasmuch as the hydrogen chloride thus produced is obtained in considerable quantity, i.e., in the instance of the perchlorethylene manufacture, about 0.9 pound for every pound of perchlorethylene produced, it is therefore desirable to recover the hydrogen chloride for sale. However, the hydrogen chloride produced in the above processes normally contains, as impurities, small amounts of water, chlorine, and various organic compounds, the principal impurity being phosgene. The phosgene, it is believed, is produced by the reaction of chlorine, and carbon monoxide formed in the system, either in the reactor or down stream therefrom, and thus becomes associated with the gaseous hydrogen chloride. Because phosgene is highly reactive with both organic and inorganic materials, its presence as an impurity in the hydrogen chloride is very undesirable and thus renders the hydrogen chloride unfit for general commercial use, particularly in processes involving reaction with organic compounds. While the water may be readily removed from the hydrogen chloride, as for example by sulphuric acid drying, the removal of the organics, and is particular phosgene, has proved to be much more difficult.

It has been proposed, specifically in the manufacture of perchlorethylene from chlorine and ethylene dichloride, to subject the by-product hydrogen chloride to a scrubbing operation, utilizing a portion of the perchlorethylene as the scrubbing agent to effect the removal of the phosgene, and chlorinated hydrocarbon compounds. Although the phosgene and other organic compounds are thus removed from the hydrogen chloride, this procedure has several disadvantages, of which the principal ones are the result of hydrogen chloride being absorbed by the end-product perchlorethylene used as the scrubbing agent. In order to reuse the perchlorethylene as a scrubbing agent or as a solvent in other processes, the absorbed hydrogen chloride must be removed from the perchlorethylene if absorption efficiency for the impurities is to be maintained. Such removal of hydrogen chloride may be effected by neutralization, for example, by dispersing the contaminated perchlorethylene in an aqueous alkaline media. This practice, however, necessitates the use of comparatively large quantities of a neutralizing solution, such as aqueous sodium hydroxide. A second method, involving two steps, is to resort to "flash evaporation" and subsequent neutralization of the residual hydrogen chloride in the perchlorethylene scrubbing agent. The term "flash evaporation" as used herein refers to a sudden reduction in pressure and vaporization of the dissolved hydrogen chloride from the perchlorethylene, also referred to as "flashing" of dissolved hydrogen chloride from solution. In either case, neutralization or "flashing" followed by neutralization, the hydrogen chloride absorbed in the perchlorethylene is lost to the waste products of the system.

Although the amount of hydrogen chloride absorbed in the perchlorethylene seems relatively small, where a large volume is treated, as in a plant producing of the order of 50 tons of perchlorethylene per day, the loss of hydrogen chloride to the waste products of the system may amount to as much as 7% of total HCl production in the course of a 24-hour period of operation. Moreover, with approximately the same production of perchlorethylene, and employing flashing and neutralization, a half a ton or more of the perchlorethylene scrubbing agent will also be lost in a 24-hour period, to the waste products of the system. Also in the practice of the neutralizing technique the system is highly corrosive, which in turn causes high equipment maintenance costs.

It has now been found that the use of a saturated chlorinated lower aliphatic hydrocarbon, such as ethylene dichloride, as the scrubbing agent for hydrogen chloride containing the above-noted contaminants affords considerable advantage over other scrubbing agents, particularly in the manufacture of unsaturated chlorinated lower aliphatic hydrocarbons which may be formed from the corresponding saturated chlorinated hydrocarbons, and the above-mentioned disadvantages are eliminated.

It is, therefore, an object of this invention to provide a method for purifying hydrogen chloride to remove impurities therefrom.

A further object of the invention is to provide a method of scrubbing hydrogen chloride, which method does not require either neutralization of the hydrogen chloride dissolved in the scrubbing agent, or flash evaporation of hydrogen chloride from the scrubbing agent.

Another object of the invention is to provide a method for removing impurities from gaseous hydrogen chloride formed as a by-product in the chlorination and dehydrochlorination of organic compounds, in which method the scrubbing agent is a reactant in the chlorination and/or dehydrochlorination reaction in which the hydrogen chloride is formed.

These and other objects will become apparent to those skilled in the art from the description of the invention which follows.

Accordingly and pursuant to the above objects, the present invention is directed to the method of purifying gaseous hydrogen chloride having phosgene associated therewith, which method includes the steps of contacting such hydrogen chloride with a liquid chlorinated lower aliphatic saturated hydrocarbon, and subsequently separately recovering said chlorinated hydrocarbon and said hydrogen chloride.

In the accompanying drawing, attached hereto and made a part hereof, the figure represents a schematic process flow sheet of a system utilizing the method and scrubbing agent of the subject invention.

In the manufacture of perchlorethylene, chlorine and ethylene dichloride are reacted under conditions conducive to the thermal chlorination and dehydrochlorination reactions. Generally, other chlorinated ethane derivatives recovered in the purification of the perchlorethylene are also added. Reactors used for this process are generally formed of nickel-clad steel or some other corrosion resultant material and house a so-called fixed fluidized bed, of catalyst particles confined in a reaction zone, supported by and suspended in a gaseous stream of reactants moving through the zone with sufficient velocity to impart turbulent motion to the mass of particles while still maintaining the mass in the zone.

The catalyst itself may be one or a mixture of various heat resistant, inert materials, such as sand, silicon carbide, clay diatomaceous earth, carbon synthetic aluminum silicate, synthetic silica-aluminum gel, alumina gel, hydrate of natural aluminum-magnesium-silicate known as "fuller's earth" and similar materials.

Generally, for the conversion of ethylene dichloride to perchlorethylene, the temperature in the reaction zone may vary between 260° C. and 540° C., with 425° C. to 440° C., being the preferred temperature range. While the reactor may be operated at atmospheric pressure, it is generally operated at a pressure between 5 and 20 p.s.i.g., with 15 to 20 p.s.i.g., being the pressure ordinarily used.

The effluent stream from the reactor is initially passed to a water-cooled condenser where the mixture of chlorinated organic compounds is separated from the hydrogen chloride and other normally gaseous by-products of the reaction, such as phosgene, the gaseous HCl, as previously stated, containing organic impurities, as well as chlorine and water. The condensed portion contains roughly 90% perchlorethylene, 8–9% underchlorinated hydrocarbons, and 1–2% overchlorinated hydrocarbons, such as hexachloroethane, which portion is then distilled to remove the over and underchlorinated "heavy" and "light" ends which are then recycled back into the reactor.

Referring specifically to the drawing and the process illustrated thereby for the manufacture of perchlorethylene, ethylene dichloride, containing impurities including hydrogen chloride and phosgene, together with higher and lower boiling fractions from the distillation of crude perchlorethylene, pass through lines 2, 4, and 6, respectively, into the bottom of the reactor 10 through line 8. Hydrogen chloride and the chlorinated hydrocarbons formed in the reactor, primarily perchlorethylene, are removed from the top of the reactor and passed though line 12 to the condenser and separator 14. Here the HCl and the crude perchlorethylene are separated, the crude perchlorethylene passing through line 16 to a fractionating column (not shown) where the higher and lower boiling fractions are separated from the perchlorethylene. These fractions are then recycled to the perchlorethylene reactor through line 6.

The crude hydrogen chloride passes from the condenser and separator 14 through line 18 to the bottom of the scrubber 20 and is contacted by a countercurrent stream of liquid ethylene dichloride which enters the top of the scrubber through line 22. The hydrogen chloride freed from the phosgene impurities removed by the ethylene dichloride passes from the top of the scrubber through line 24 to a sulphuric acid dryer (not shown) and is then compressed preparatory for use in organic hydrochlorination reactions and the like.

The ethylene dichloride, containing phosgene and other organic impurities, is removed from the bottom of the scrubber 20 and passes through line 26, which feeds it back into the reactor 10. By feeding the ethylene dichloride, containing absorbed phosgene and hydrogen chloride, with, or without the auxiliary ethylene dichloride, through lines 26, 2, and 8, directly back into the reactor to make more perchlorethylene, the need for neutralization or flash evaporation of the ethylene dichloride is entirely eliminated. This eliminates also the cost of a neutralizing agent, such as sodium hydroxide, as well as the corrosion problems and high maintenance costs incident to this technique, and at the same time the hydrogen chloride loss, resulting from flash evaporation or neutralization, is also eliminated.

In the hydrogen chloride scrubber, the temperature at the bottom of the scrubbing column is preferably maintained at about 1°–2° C., and the pressure in the column is preferably about 80 pounds per square inch. It has been found that for optimum results in the removal of impurities, the temperature of the ethylene dichloride entering the top of the scrubbing column is suitably maintained between about −24° C. and −28° C., with −26° C. being the preferred temperature.

By feeding the ethylene dichloride, containing phosgene and other impurities, directly from the scrubber to the perchlorethylene reactor, it would appear that the phosgene level of the system would gradually increase. However, in actual practice such is not found to be the case. The phosgene level in the effluent gases from the reactor attains a maximum of approximately .25% by weight, after which no substantial increase in the amount of this compound occurs. Why the amount of phosgene does not continue to increase is not entirely clear, except the possibility that some of the phosgene may be decomposed in the reactor, or that concentrations of phosgene above about 0.25% by weight, in the system inhibit the formation of more phosgene. There is also the fact that phosgene is appreciably soluble in perchlorethylene, and hence some may be carried over into the perchlorethylene purification system. There is also the possibility that the phosgene forms "polymers" such as diphosgene (trichlormethylchloroformate) which are absorbed by the perchlorethylene and are also carried over into the perchlorethylene purification system.

In order that those skilled in the art may better understand the present invention, and in what manner the same may be carried into effect, the following specific examples are offered.

*Example I*

At 24° C. and atmospheric pressure a stream of anhydrous HCl containing 2.5 volume percent phosgene is fed simultaneously to two scrubbers, one containing perchlorethylene and the other containing ethylene dichloride. After one hour the solvents were analyzed for phosgene and HCl, with the following results:

|  | wt. percent HCl | wt. percent $COCl_2$ |
| --- | --- | --- |
| Ethylene dichloride | 0.87 | 0.40 |
| Perchlorethylene | 0.32 | 0.11 |

The much greater affinity of the saturated chlorinated hydrocarbon, for phosgene, in the mixture is apparent.

*Example II*

HCl containing 10% phosgene is fed simultaneously to two scrubbers, one ethylene dichloride and the other perchlorethylene. The temperature is reduced to 10° C., held constant, and after thirty minutes a sample is taken from each of the solvents and analyzed for phosgene. After forty-five minutes the absorbers are again sampled and analyzed. When the percent phosgene in these two sets of samples is approximately constant for the particular solvent, the system is considered to be at equilibrium. The temperature of the solvent in the scrubbers is increased slightly several times and the same procedure followed. The results of these experiments are as follows:

| T, °C. | Percent $COCl_2$ | |
| --- | --- | --- |
|  | Ethylene dichloride | Perchlorethylene |
| 10 | 3.45 | 1.1 |
| 15 | 2.7 | 0.9 |
| 20 | 1.9 | 0.8 |
| 30 | 1.4 | 0.7 |

These data clearly show that the ethylene dichloride readily absorbs phosgene from gaseous HCl even though the solubility of HCl in ethylene dichloride is greater than that of phosgene.

Example III

In a commercial process for the production of perchlorethylene, 1960 pounds per hour of ethylene dichloride (containing about .87% absorbed hydrogen chloride and about .40% absorbed phosgene, as a result of having been used to scrub hydrogen chloride gas containing phosgene), 1770 pounds per hour of a mixture of other chlorinated $C_2$ hydrocarbons, and 3822 pounds per hour of chlorine are fed into a nickel-clad tubular steel reactor, having a bed of a silica-alumina catalyst supported by and suspended in the stream of reactants so as to maintain the catalyst bed in a "fluidized" condition. Internally the reactor is maintained at a temperature within the range of 425°–437° C. 2500 pounds per hour of hydrogen chloride gas containing phosgene, other chlorinated organic compounds, chlorine, and water is produced. The crude gaseous hydrogen chloride is fed into the bottom of a scrubber column where the temperature is 2° C., and 1960 pounds per hour of ethylene dichloride at a temperature of −26° C., is fed into the top of the column. The gaseous hydrogen chloride, after being countercurrently contacted by the liquid ethylene dichloride, emerges from the top of the column and is found to have substantially all of the phosgene as well as chlorinated organic compounds, and the chlorine removed. About 2250 pounds per hour of purified hydrogen chloride is produced. The hydrogen chloride is withdrawn from the system, passed through sulphuric acid to remove the last traces of water, and then is compressed to 80 pounds per square inch pressure gauge, for use in an organic hydrochlorination reaction.

The ethylene dichloride with its absorbed impurities, is fed to the reactor along with other chlorinated $C_2$ hydrocarbons and chlorine, as noted above.

An analysis of the purified hydrogen chloride, prior to sulphuric acid drying, gives the following results:

| | |
|---|---|
| Phosgene | Too low to be determined.[1] |
| Organics | .082% by weight. |
| Chlorine | .010% by weight. |
| Water | .012% by weight. |

[1] By infra-red absorption method.

Chlorohydrocarbon losses, very small from this system, are of the order of 72 pounds per day as compared with the loss of 1060 pounds per day when perchlorethylene is used as the solvent in the scrubbing column.

No build up in phosgene in the system is apparent.

When perchlorethylene is used in the scrubbing column as a solvent for the phosgene, 4320 pounds per day of HCl is lost due to flashing the effluent from the scrubbing column and then neutralizing the residual dissolved HCl in the perchlorethylene. Due to the greater solubility of HCl in ethylene dichloride, less HCl is flashed and the residual dissolved HCl is recycled to the perchlorethylene reactor, thereby reducing the HCl loss.

By way of comparison, the following table gives the maximum amounts of impurities which can be tolerated in hydrogen chloride used in commercial manufacture of ethylene chloride for use in making organo-metallic compounds:

| | |
|---|---|
| Phosgene | Too low to be determined.[1] |
| Organics | .30% by weight. |
| Chlorine | .05% by weight. |
| Water | .03% by weight. |

[1] By infra-red absorption method.

It will be immediately apparent to those skilled in the art that principles of the present invention may be applied equally satisfactorily to the purification of hydrogen chloride from the dehydrochlorination of s-tetrachloroethane wherein trichlorethylene is formed, the tetrachloroethane would be the preferred chlorinated saturated lower aliphatic hydrocarbon material with which the hydrogen chloride is scrubbed, and the tetrachloroethane could then be passed through the dehydrochlorination reactor in the same manner as that described above with the equal advantage attendant thereupon. Also, other chlorinated saturated lower aliphatic hydrocarbons, i.e., those having from 2 to 6 carbon atoms in the molecules thereof, may be employed for the purpose of removing impurities from hydrogen chloride, in accordance herewith, which chlorinated hydrocarbons should be liquid at the temperatures and pressures employed for contacting the hydrogen chloride and purifying agent.

It is to be understood that although the invention has been described with specific reference to particular embodiments thereof, it is not to be so limited since changes and alterations therein may be made which are within the full intended scope of this invention as defined by the appended claims.

What is claimed is:

1. In the process wherein ethylene dichloride and chlorine are reacted in a reaction zone at a temperature which causes chlorination and dehydrochlorination of the ethylene dichloride to form a mixture comprising perchlorethylene and hydrogen chloride and impurities associated therewith, which mixture is cooled to form a liquid phase comprising perchlorethylene and a gaseous phase comprising hydrogen chloride and associated impurities of which phosgene is the major one, and the liquid and gaseous phases are separated, the improvement which comprises contacting said gaseous phase with liquid ethylene dichloride to remove the phosgene and other impurities associated with said hydrogen chloride, separating said liquid ethylene dichloride containing the said removed impurities from said hydrogen chloride and introducing said ethylene dichloride into the reaction zone for reaction with chlorine to form perchlorethylene.

2. The method of claim 1 wherein the streams of ethylene dichloride and gaseous hydrogen chloride are countercurrently contacted.

3. The method of claim 2 wherein the temperature of said stream of ethylene dichloride is gradually increased as said stream of ethylene dichloride approaches the point of initial contact with said stream of hydrogen chloride.

4. The method as claimed in claim 3 wherein the temperature of said stream of ethylene dichloride is initially within the range of −24° C. to −28° C.

References Cited in the file of this patent

UNITED STATES PATENTS

| | | |
|---|---|---|
| 2,402,978 | Allen et al. | July 2, 1946 |
| 2,442,324 | Heitz et al. | May 25, 1948 |
| 2,746,998 | Brown et al. | May 22, 1956 |

FOREIGN PATENTS

| | | |
|---|---|---|
| 755,844 | Great Britain | Aug. 29, 1956 |

OTHER REFERENCES

Mellor: "A Comprehensive Treatise on Inorganic and Theoretical Chemistry," vol. 5, Longmans, Green & Co., New York, N.Y., 1924, p. 966.